No. 706,553. Patented Aug. 12, 1902.
C. M. HALL.
PROCESS OF MANUFACTURING ALUMINA.
(Application filed Aug. 10, 1901.)
(No Model.)

WITNESSES
INVENTOR
Charles M. Hall

UNITED STATES PATENT OFFICE.

CHARLES M. HALL, OF NIAGARA FALLS, NEW YORK.

PROCESS OF MANUFACTURING ALUMINA.

SPECIFICATION forming part of Letters Patent No. 706,553, dated August 12, 1902.

Application filed August 10, 1901. Serial No. 71,639. (No specimens.)

*To all whom it may concern:*

Be it known that I, CHARLES M. HALL, of Niagara Falls, Niagara county, New York, have invented a new and useful Process of Manufacturing Alumina, of which the following is a full, clear, and exact description, reference being had to the accompanying drawings.

Figure 1:
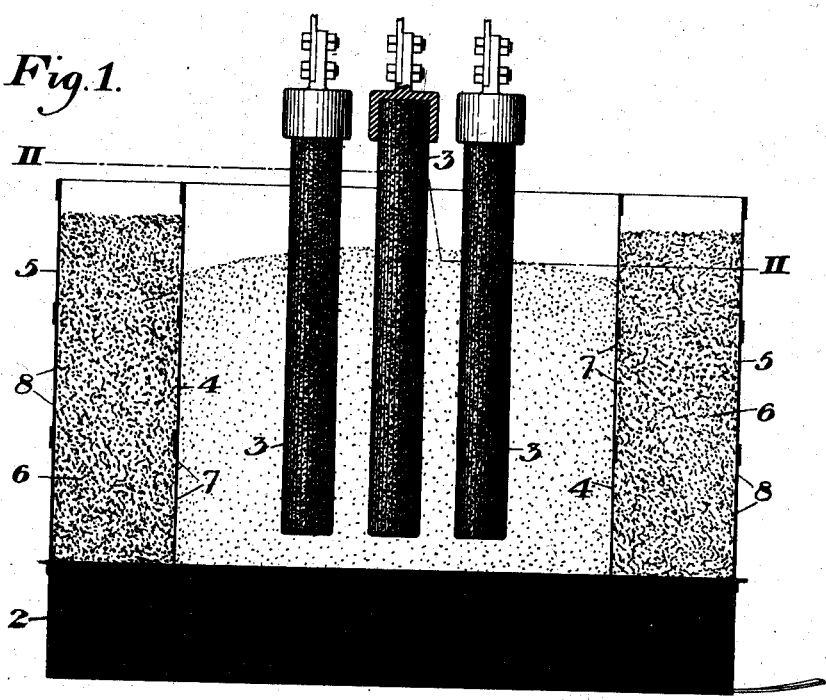
Figure 2:
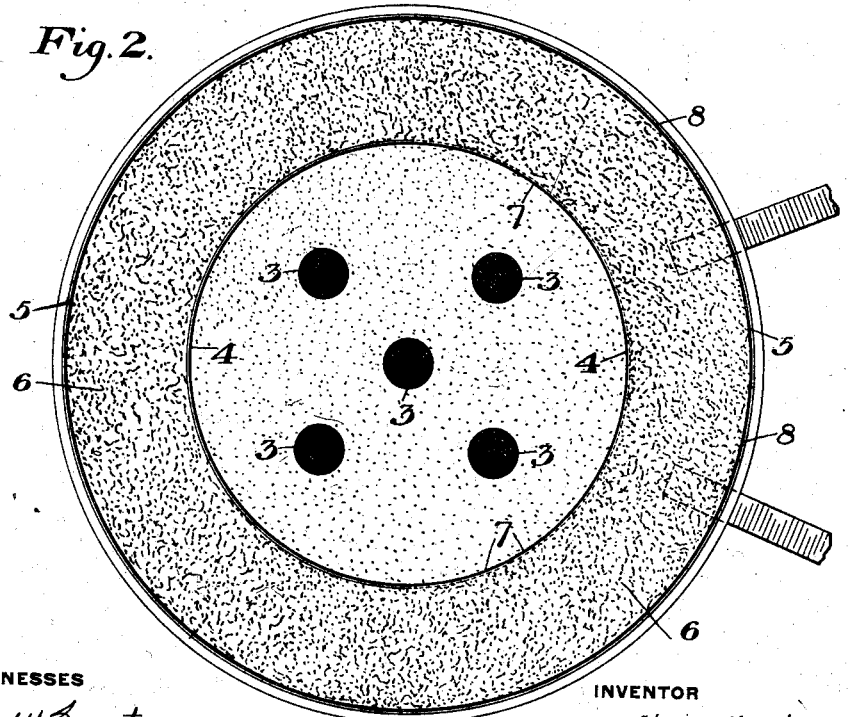

Figure 1 shows in vertical section apparatus suitable for the practice of my invention, and Fig. 2 is a horizontal section on the line II II of Fig. 1.

In the process described in my prior patent, No. 677,207, for purifying bauxite or similar material containing alumina, including the silicates of aluminium, it is important to reduce as much as possible the consumption of electric power. It is also desirable to reduce the evolution of carbonic monoxid gas, for the reason that if much gas is given off it is apt to blow portions of the material out of the furnace and to render the operation difficult to control. One method of accomplishing these two objects is described in my prior patent, No. 677,208, in which aluminium, pure or alloyed, is used as a reducing agent for the impurities of the bauxite. I have now discovered a cheaper and more economical method of accomplishing these results—namely, to partially reduce the material by means of carbon and a high degree of heat, generated by the electric current before it is put into the zone of fusion in the electric furnace. In order to accomplish this object, I mix the bauxite or other impure oxid of aluminium (in which term I include the silicates) with an amount of carbon proper to reduce the iron oxid, silica, and titanic acid, and, if the iron is deficient, with sufficient iron or other heavy metal to alloy with the silicon and titanium to be reduced, and I then heat the mixture in an electric furnace to a high temperature, but below the melting-point of alumina. By this means the iron oxid contained in the bauxite is substantially reduced to metallic iron, and the silica, and generally the titanic acid, seems to be partially reduced. With some grades of bauxite the material is fritted together—*i. e.*, it seems to undergo incipient fusion. An advantage of thus fritting the material instead of completely fusing it is that at the temperature at which such fritting occurs the reduction of the impurities goes on slowly, and the mass remains porous and allows the escape of gases. After allowing the mass to cool it is taken out, broken up if fritted together, and it is then fused by means of an electric current, and while fused the reduction of the impurities is completed, and the reduced iron, silicon, and titanium agglomerate into fused masses, which at the end of the process can readily be separated from the purified alumina.

For the preliminary treatment of the bauxite any suitable form of electric furnace may be used; but I prefer to use one in which a diffused heat is supplied to the mass, for it is not desirable in this operation to fuse the bauxite or to use a source of heat concentrated at any point, as if this is done the same difficulties of evolution of gas which it is the purpose of this invention to avoid are apt to occur.

I may use a form of electric furnace having a large carbon core, either granular or solid, with the material piled around it, similar to that used in the well-known carborundum furnaces, and in such case the current should be so regulated in this core as to heat the charge to be treated to the best working temperature—that is, to the point at which the iron is reduced—and the silica and, in some cases, titanic acid are reduced partially or wholly but without substantial fusion of the bauxite. The best and most economical means of accomplishing the result of this preliminary treatment of the bauxite I have found to be to pile the material to be treated—that is the raw bauxite mixed with carbon and with iron, if necessary—around the zone of fusion in the same electric furnace, and, in fact, forming a part of the same furnace in which the final operation of fusion and purification of a previously-treated amount of bauxite takes place. In this way I utilize the waste heat of the fusion process, and the heat given off by the fused charge after the fusion and separation is complete to heat up and partially reduce without fusion a mass of material which is subsequently treated in the same furnace or in another furnace in the zone of fusion, a new mass of material being piled around it and treated as before. The apparatus which I use in this operation consists, preferably, as shown in the drawings, of a round carbon block or base 2, forming one electrode of the apparatus, and one or more carbon-rods or groups of rods 3, hanging from above and forming the other electrode. Two concentric sheet-iron shells 4 5 are placed upon the carbon base, leaving the interior of the inner shell to constitute the zone of fusion. The space 6 between these two shells is filled with a mixture of carbon and bauxite, together with extra iron, if necessary. The fusion is started in the interior of the inner shell by bringing the hanging electrodes in contact with the carbon base, turning on the current, slightly raising the hanging electrodes to form an arc, and piling around them previously-treated bauxite for fusion and purification. The inner iron shell had best be perforated, as at 7, so as to allow whatever gas there is to escape on all sides, and there should be openings 8 for gas in the outer shell. This gas is at an extremely high temperature as it leaves the neighborhood of the electrodes and gives up its heat to the material through which it passes, heating the unreduced charge in the outer portion of the furnace and to some extent the material around the electrode which is subsequently to be fused. As the process continues, more and more of the charge in the zone of fusion is fused, and more is added as the mass of melted material rises higher and higher. This melted material gives off a portion of its heat to the fresh charge surrounding the zone of fusion, raising its temperature and causing a partial reduction of the impurities. The process continues until as much material has been fused in the inner space as the furnace can safely hold, or as much as the power used can keep in fusion at one time, for it is not desirable to continue the process until a portion of the charge which has once been melted becomes solidified by attempting to melt too much. The current is then taken off and the hanging electrodes are withdrawn and the furnace is allowed to stand. The liquid bauxite and the iron alloy in the zone of fusion gradually cool and solidify, giving off their heat to the surrounding bauxite. This is an important part of the operation when it is conducted under the best conditions, for the reason that it utilizes a considerable portion of the otherwise wasted heat energy of the fused alumina, which on account of the well-known very high melting-point of alumina must be at an extremely high temperature. This heat is largely transmitted into the charge surrounding the zone of fusion and causes the reaction of the carbon there, with the iron oxid present, and to a greater or less extent with the silica or silica and titanic acid. At the same time it dries out the last traces of water, which it is almost impossible to remove in an ordinary calcining operation. When the operation is worked on a fairly large scale, I have found it desirable after the current is taken off to allow the furnace to stand for days and even two or three weeks. As bauxite is a very poor conductor of heat, it transmits it slowly from the interior to the outside, so that the interior mass keeps hot and the outer portions of it continue to grow hot for a considerable time. When the furnace has been allowed to stand for a sufficient time it is pulled down, and the unfused material, much of which has undergone incipient fusion or, at least, is partially fritted together, is taken out and broken up more or less and used in the zone of fusion in the subsequent operation, fresh mixture of bauxite and carbon being used, as above described, to form the outer portions of the furnace and to absorb and utilize the heat of the charge, which would otherwise be wasted.

When the furnace is pulled down and the partially-reduced material is taken out, it is desirable to expose it as little as possible to the air while in the heated condition, for the reason that the reduced iron present being in a finely-divided form is liable to reoxidize, and the same is true of the silicon and titanium so far as they are reduced.

I have worked my process successfully with a current of about five-hundred-horse power at approximately fifty bolts and seven thousand two hundred amperes, the charge being placed upon a carbon slab seven feet in diameter and fourteen inches thick, and a group of five suspended carbons being employed to constitute the electrode; but these may be varied by the skilled operator.

I claim—

1. The method herein described of purifying bauxite or other impure oxid of aluminium, which consists in heating the same in admixture with a reducing agent by means of an electric current without substantial fusion, thereby reducing the contained impurities in whole or in part, removing the mass so treated and afterward fusing it in an electric furnace and causing the impurities to agglomerate; substantially as described.

2. The method herein described of purifying bauxite or other impure oxid of aluminium, which consists in heating and fritting the same in admixture with a reducing agent by means of an electric current, without substantial fusion, reducing thereby the contained impurities in whole or in part, removing the mass so treated and afterward fusing it in an electric furnace and causing the reduced impurities to agglomerate; substantially as described.

3. The method herein described of purifying bauxite or other impure oxid of aluminium, which consists in surrounding a mass containing such oxid with a mixture of like oxid and carbon, subjecting it to heat generated by an electric current, fusing it thereby and causing the impurities thereof to unite in a fused alloy, and by the waste heat so developed effecting a reduction, in whole or in part, of the surrounding mixture without substantial fusion of such mixture, then removing the purified central mass, and subsequently fusing such surrounding mixture to effect the removal of its impurities; substantially as described.

4. The method herein described of purifying bauxite or other impure oxid of aluminium, which consists in surrounding a mass containing such oxid with a mixture of like oxid and carbon, subjecting it to heat generated by an electric current, fusing it thereby and causing the impurities thereof to unite in a fused alloy, allowing said mass to cool slowly, and by the waste heat so developed effecting a reduction, in whole or in part, of the surrounding mixture without substantial fusion of such mixture, then removing the purified central mass, and subsequently fusing such surrounding mixture to effect the removal of its impurities; substantially as described.

5. The method herein described of purifying bauxite or other impure oxid of aluminium, which consists in surrounding a mass containing such oxid with a mixture of like oxid and carbon, subjecting it to heat generated by an electric current, fusing it thereby and causing the impurities thereof to unite in a fused alloy and by the waste heat so developed effecting a reduction in whole or in part, of the surrounding mixture without substantial fusion of such mixture, then removing the purified central mass, and subsequently fusing such surrounding mixture in like manner in the middle of a surrounding mixture of impure oxid and carbon; substantially as described.

In testimony whereof I have hereunto set my hand.

CHARLES M. HALL.

Witnesses:
K. M. FLAHERTY,
T. J. BOSTWICK.